United States Patent [19]
Gupta et al.

[11] Patent Number: 4,744,524
[45] Date of Patent: May 17, 1988

[54] EQUIPMENT FOR MAKING NO-BEANY FLAVOR SOYMILK

[75] Inventors: Rajendra P. Gupta; Rashmi R. Gupta, both of Ottawa, Canada

[73] Assignee: Prosoya Corporation, Maryland Heights, Mo.

[21] Appl. No.: 32,538

[22] Filed: Apr. 1, 1987

[51] Int. Cl.⁴ .............................................. B02C 19/12
[52] U.S. Cl. .................................. 241/36; 241/46.02; 241/46.06; 241/65; 241/DIG. 14; 426/518
[58] Field of Search ............. 241/DIG. 14, 21, 101.2, 241/189 R, 74, 69, 186 A, 186 R, 186.2, 46.17, 36, 46.02, 46.06, 65; 426/598, 523, 518, 508

[56] References Cited
U.S. PATENT DOCUMENTS

| | | | |
|---|---|---|---|
| 3,901,978 | 8/1975 | Nelson et al. | 426/598 |
| 4,209,541 | 6/1980 | Clatfelter et al. | 426/518 X |
| 4,369,198 | 1/1983 | Uchi et al. | 426/518 X |
| 4,463,022 | 7/1984 | Sterner et al. | 426/518 X |

FOREIGN PATENT DOCUMENTS

| | | | |
|---|---|---|---|
| 11258 | 1/1979 | Japan | 426/518 |
| 41454 | 3/1985 | Japan | 426/518 |

Primary Examiner—Mark Rosenbaum
Attorney, Agent, or Firm—Robert G. Hendry

[57] ABSTRACT

An equipment is described to produce soymilk without the undesirable beany flavor and bitter taste of ordinary soymilk. The equipment comprises grinding soybeans totally in an aqueous medium at room temperature without trapping any air, cooking the resulting slurry, and separating the undesolved solids to extract soymilk. The fact that no heat needs to be given to soybeans prior to or during the grinding operation, yields very high percentage of solids in soybeans as dissolved solids in soymilk without rendering chalkiness found in the soymilks made employing the hot-grind and blanching methods. The equipment can also be used for making bland nutritional extracts of other protein rich seeds which are known to give rise to flavor problem in foods made from them.

8 Claims, 3 Drawing Sheets

EQUIPMENT FOR MAKING NO-BEANY FLAVOR SOYMILK

FIELD OF THE INVENTION

This invention concerns making artificial milk from plant seeds such that the undesirable flavors and taste are prevented from developing. More specifically, this invention relates to producing no-beany soymilk without bitterness or chalkiness from soybeans.

BACKGROUND OF THE INVENTION

The artificial milk made from soybeans, hereafter called soymilk, is well recognised to be a highly nutritious, versatile and economical food. However, most methods of making soymilk develop unacceptable off-flavors which greatly limit its use.

Plant protein in legumes and oilseeds, such as cottonseed, peanut, rapeseed, saflower, sesame, soybean and sunflower, is of high enough quality to be almost nutritionally equivalent to the animal protein at a fraction of the cost of the latter. The processing of these seeds to make protein foods having high solubility in water usually leads to flavor and taste problems. Such problems have limited their use mainly for edible oil extraction. The protein rich seed meal remaining after extraction of oil is used essentially as animal feed.

It is well known that certain enzymes present in soybeans and many other seeds are the major cause of off-flavors arising upon processing these seeds for foods. Polyunsaturated fatty acids are catalytically oxidized by the enzymes in the presence of water and oxygen to produce hydroperoxides which finally yield the off-flavor causing volatiles. Lipoxygenase, distributed throughout the soybean cotyledons, becomes active as soon as their cell structure is broken. Therefore, the control of off-flavors has traditionally been done by inactivating the enzyme, such as by heating and/or altering pH of the aqueous medium in which the seeds are disintegrated. The problem with these treatments has been that they tend to insolublize the soybean protein and thereby reduce soymilk yield and make it chalky in mouthfeel. The degree of enzyme inactivation required to reduce the off-flavors to acceptable level leads to an unacceptably low protein solubility. An approach of tackling the problem is to only partially inactivate the enzyme, remove most remaining off-flavor by deodorization, and mask any residual off-flavor by flavoring. In another approach, the enzyme is totally inactivated prior to disintegrating the beans, and the resulting insoluble soybean protein is dispersed in water by fine grinding and high pressure homogenizing. Yet another approach has been to inactivate the enzyme partially by grinding the beans in hot, pH controlled aqueous medium under limiting oxygen condition. Existing methods of making no-beany flavor soymilk are based on the above approaches or a combination of these.

Only recently was it recognized and demonstrated that it is totally unnecessary to inactivate the enzyme, prior to or during the disintegration of soybeans, if said disintegration is carried out in an oxygen-free environment. This method has yielded soymilk with absolutely no beany flavor, high degree of dissolved proteins and other soybean solids and no bitterness or throat catching sensation. Employing this method, the present invention describes an equipment to make soymilk, and aqueous extract of other seeds having problems similar to that of soybeans, in commercial as well as small quantities.

DESCRIPTION OF THE PRIOR ART

There are several methods for making palatable products from seeds containing lipoxygenase and the like enzymes which cause bad odor, flavor and taste in the end products. Many of these deal with the processing of soybeans. The flavor problems in foods from soybeans have been reviewed by J. E. Kinsella and S. Damodaran in a book "The Analysis and Control of Less Desirable Flavors in Foods and Beverages" edited by G. Charalambous and published by Academic Press in 1980. The fact that the enzymes are heat sensitive and have greatly reduced activity in alkaline as well as acidic aqueous media, has been used in many processes for the control of undesirable flavors. Wilkens et al, in an article published in 1967 in Food Technology, Vol. 21, p. 1630, have described a method of producing nearly bland soymilk by grinding soybean in hotwater having temperature 80° C. or higher and maintaining the resulting slurry at such temperature for 10 minutes or longer to completely inactivate lipoxygenase. Nelson et al, in the U.S. Pat. No. 3,901,978 issued on Aug. 26, 1975, have detailed a process in which steeped soybeans are blanched to inactivate the enzyme before grinding. Wakana et al, in the U.S. Pat. No. 4,241,100 issued on Dec. 23, 1980, claimed a process to make good tasting soymilk by boiling unsteeped soybeans in an alkaline aqueous medium for few minutes to inactivate the enzyme before grinding the beans. Uchi and Hatanaka have disclosed in a U.S. Pat. No. 4,369,198 issued on Jan. 18, 1983 that soymilk with reduced odor can be made by grinding unsteeped soybeans in deoxygenated hot water from 70° C. to the boiling point under anaerobic condition.

There are several variations of the above methods described in the open and patent literature. But excepting the method of Gupta and Gupta, disclosed for the first time in the Canadian patent application No. 477,902 filed on Mar. 29, 1985, all these methods require heat treatment of soybeans prior to or during their disintegration operation or both. Such heat treatment reduces the soymilk yield significantly and imparts chalkiness in the end product. Improving yield by fine grinding the solids and high pressure homogenization causes soymilk to have high degree of suspended particles, which results in increased sensation of chalkiness in the mouth.

Gupta and Gupta realized that if the disintegration of soybeans and other problem seeds is carried out in an environment so low in molecular oxygen that none is available to the reactions catalysed by lipoxygenase to create off-flavor causing volatiles, then there will be no need to inactivate the enzyme at least until after the disintegration of the seeds. By altogether avoiding heat treatment of seeds prior to or during the disintegration process, they were able to eliminate the concomitant effect of insolubilizing protein in the seeds. Within the scope of this new approach, the present invention describes an equipment that produces soymilk at commercial scale with absolutely no beany flavor.

SUMMARY OF THE INVENTION

The main objective of this invention is to provide an equipment that can be used for the commercial scale production of artificial milk from soybeans, and aqueous extract of other problem seeds, without the undesirable off-flavors, mouthfeel or bitterness. The equipment eliminates free-oxygen from the seed disintegration environment by carrying out the disintegration entirely in an aqueous medium and preventing completely the access of air to the disintegration region. In some adaptations of the equipment it is possible to pressure cook the resulting seed slurry in aqueous medium to the desired temperature and duration under pressure before expelling it from the equipment for further processing.

DESCRIPTION OF THE PREFERRED EMBODIMENTS

Figure 1:
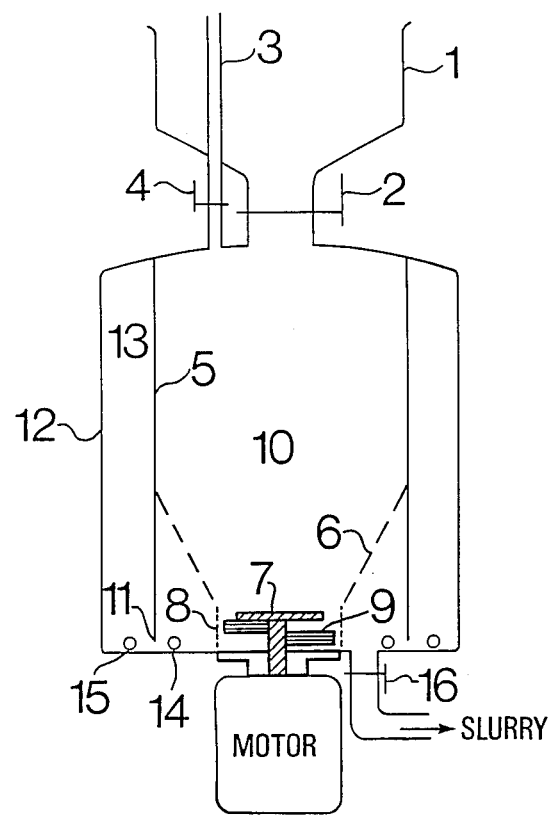
FIG. 1 is a schematic drawing of a batch type airless disintegrator cum cooker in accordance with the invention.
Figure 2:
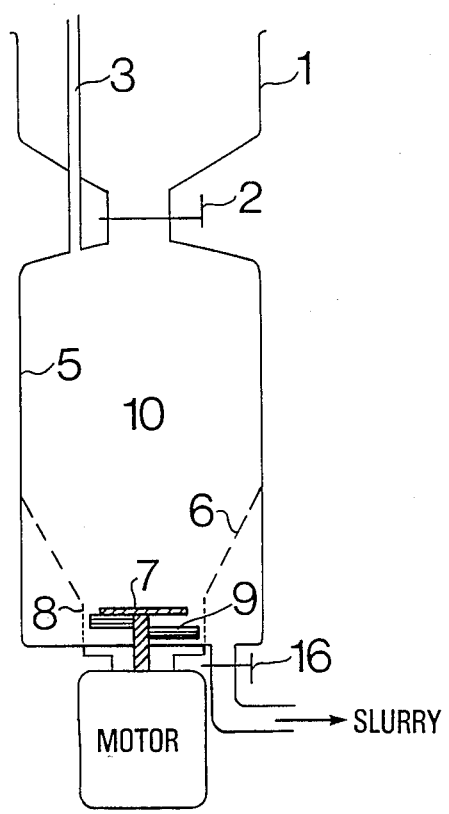
FIG. 2 is a schematic drawing of a batch type airless disintegrator in accordance with the invention.
Figure 3:
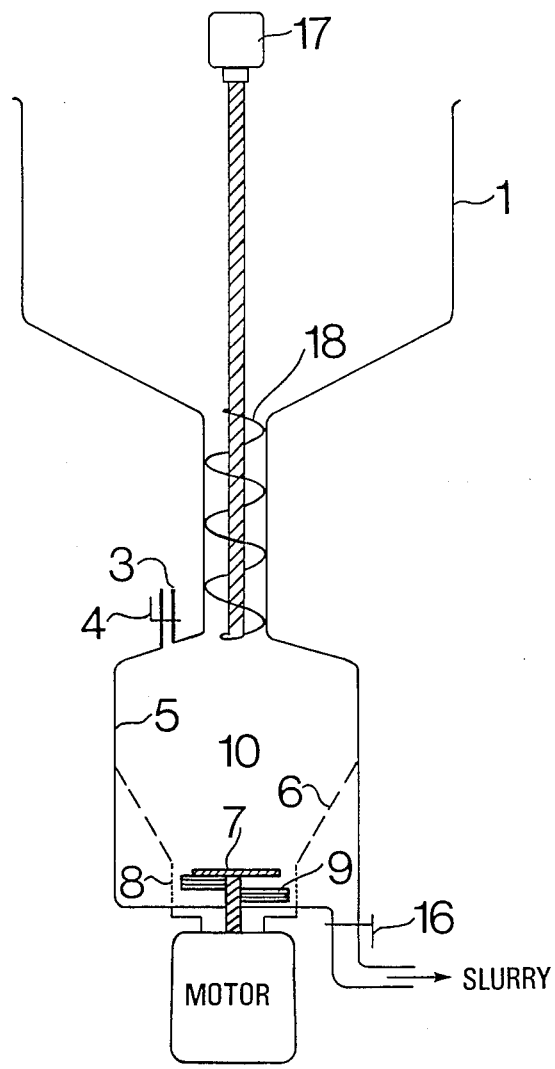
FIG. 3 is a schematic drawing of a continuous type airless disintegrator in accordance with the invention.

The invention can be shown schematically such as in FIGS. 1, 2 and 3. FIG. 1 depicts an embodiment of the invention in which pressure cooked no-beany flavor aqueous slurry of soybeans and the like problem seeds is the output of the equipment. Steeped or dry beans, adequately cleaned and washed, are put into the equipment with water through hopper 1 by opening a valve 2. The water is made slightly alkaline such as by adding about 0.05% sodium bicarbonate to ordinary drinking or deaerated water, but could also be made slightly acidic or a solution of a salt. Opening of the valve 4 helps air to escape through the vent tube 3 to allow the beans and water to flow freely into the grinding region 10. A quantity of beans and water sufficient to fill the equipment above the level of valves 2 and 4 is admitted. In the filling process water rises only partially in region 13 through a narrow opening 11 at the bottom of the wall 5 separating the two regions. The opening 11, connecting the region 10 and 13, is made in such a way that there is almost no dynamic coupling of fluids in the two regions, while permitting fluid thermal expansion in region 10. The volume of air trapped in region 13 is large enough, prior to steam infusion heating, that upon being compressed by condensed steam, the pressure in the vessel remains within the safe operating limit of the equipment.

The beans are directed to the hammermill 9 with a preforated hopper 6 which allows the ground beans to pass through it almost uninterrupted. A disc 7 regulates the flow of beans in the hammermill. Screen 8 permits only well ground beans to leave the hammermill. Circular steam injection pipes 14 and 15 can independently heat the contents of regions 10 and 13. The outer wall 12 of the vessel is designed to withstand the pressure and temperature desired for cooking the slurry. The slurry is extracted from the equipment by opening valve 16.

After the equipment is charged with the beans and water in the desired ratio, and the valves 2 and 4 are closed upon taking care that no air is trapped in region 10, the hammermill motor is started to grind the beans. After the bean grinding is complete, the slurry is cooked by steam infusion to the desired temperature. In an actual commercial operation the steam infusion is begun simultaneously with the grinder motor to save time. However, until the grinding is essentially complete the temperature is not allowed to rise above 60° C. to avoid adversely affecting the protein solubility of the beans in water. Once the bean grinding is complete, the motor speed may be stepped down. The hammermill now acts as a mixer to generate forced convection in the fluid to heat it evenly. When the slurry is cooked it is expelled from the equipment to a centrifuge or some other device to extract soymilk.

FIG. 2 shows an embodiment of the invention in which uncooked no-beany flavor slurry of soybeans and the like seeds is the output of the equipment. This equipment differs from that of FIG. 1 in that it does not have the outer vessel 12 and the circular steam heating pipes. Also the vent tube is not provided with a valve. The equipment is charged to the level just above valve 2 with the beans and water in the desired ratio, and then valve 2 is closed. The motor is started to grind the beans. The vent tube 3 prevents building up of pressure in the equipment as a result of any increase in volume of the fluid by frictional heating. After all the beans are ground, which may be detected by monitoring current through the grinder motor, the slurry is pumped out either to a solid-liquid separator to extract soymilk or the like before cooking, or to a cooker.

The above embodiments of the invention are for making soymilk and the like in batch processing mode.

By taking the output of the grinder in FIG. 2 to a balance tank and using a continuous cooker, the production of soymilk and the like can be easily made continuous. Alternatively, two of the above described equipments can be made to operate in parallel such that while one is performing the grinding operation, the other is being emptied for further processing.

In yet another embodiment of the invention, FIG. 3, the beans and water in desired ratio are continuously fed to the grinder using a screw conveyor 18 driven by a motor 17, and the slurry is continuously taken out through a valve 16. Care is taken that air is not sucked into the grinder while it is operating by providing a mechanism to stop grinder motor if water in the feed hopper 1 falls below a predetermined level.

It is understood that as used herein (a) the term "water" includes drinking water, deaerated water, and dilute aqueous solution of an acid, alkali or salt; (b) the terms "soybean", "bean" and "seed" include all the seeds which give rise to flavor problem in making aqueous extracts due to the presence of oxygen at the time of disintegrating them; and (c) the term "soymilk" includes aqueous extract of the seeds.

Since many apparently widely different embodiments of this invention could be made without departing from the scope and spirit thereof, it is intended that all matter contained in the above description be interpreted as being illustrative only and not limiting.

The embodiments of the invention in which an exclusive property or privilege is claimed are defined as follows:

1. An equipment for making aqueous extracts of protein and oil containing seeds, said equipment comprising:

an enclosure to maintain an environment devoid of free-oxygen to prevent seed enzymes from producing off-flavors and bitter taste during the disintegration of said seeds at a temperature which is lower than the temperature required to inactivate the enzymes and concomitantly insolubilize the seed proteins;

means to remove completely free-oxygen or air from said enclosure;

means to disintegrate said seeds;

means to introduce into said enclosure said seeds and an aqueous medium in the desired proportions; and means to extract the slurry of disintegrated seeds in said aqueous medium from said enclosure;

wherein said aqueous medium comprises a liquid selected from a group consisting of ordinary water, deaerated water, dilute aqueous solution of an acid, dilute aqueous solution of an alkali, and dilute aqueous solution of a salt.

2. The equipment in accordance with claim 1 wherein:

said enclosure is shaped to fill completely with said aqueous medium and said seeds without trapping air anywhere in said enclosure; and said means to remove free-oxygen is a vent to permit escape of air from said enclosure.

3. The equipment in accordance with claim 2 wherein said means to disintegrate seeds comprises a disintegrator selected from a group consisting of hammermill, colloid mill, attrition mill, rollermill, and crusher.

4. The equipment in accordance with claim 3 which further comprises:

a vessel connected to said enclosure to accept expanded contents of said enclosure resulting from heating; and means to heat or cook contents of said vessel and said enclosure.

5. The equipment in accordance with claim 4 wherein said enclosure is inside said vessel and the two are connected internally with one or more openings preferably near the bottom such that air will not transfer to said enclosure from said vessel before or during the period said means to disintegrate is operational.

6. The equipment in accordance with claim 5 wherein:

said seeds comprise steeped soybeans;

said aqueous medium comprises water and up to 0.1 percent sodium bicarbonate; and said means to heat or cook infuses steam evenly to the contents of said equipment.

7. The equipment in accordance with claim 3 wherein:

said means to introduce comprises a screw conveyor to continuously feed said enclosure with said seeds and said aqueous medium without trapping or introducing any air in said enclosure;

said means to extract removes said slurry continuously from said enclosure without introducing any air in said enclosure; and which further comprises:

a continuous cooker to cook said slurry extracted from said enclosure; and in order to prevent air from entering said enclosure inadvertently, means to stop said means to disintegrate and simultaneously close said means to extract when aqueous medium in the entrance region of said screw conveyor reaches a predetermined level.

8. The equipment in accordance with claim 7 wherein:

said seeds comprise steeped soybeans; and said aqueous medium comprises water and up to 0.1 percent sodium bicarbonate.

* * * * *